US 7,589,134 B2

(12) United States Patent
Pfenninger et al.

(10) Patent No.: US 7,589,134 B2
(45) Date of Patent: Sep. 15, 2009

(54) ADHESIVE FILLED WITH SURFACE-TREATED CHALK AND SOOT

(75) Inventors: Ueli Pfenninger, Au (CH); Ursula Stadelmann, Zurich (CH); Annemarie Kuelling, Winterthur (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 11/948,836

(22) Filed: Nov. 30, 2007

(65) Prior Publication Data

US 2008/0255286 A1    Oct. 16, 2008

Related U.S. Application Data

(63) Continuation of application No. 11/399,364, filed on Apr. 7, 2006, now abandoned, which is a continuation of application No. 10/476,525, filed as application No. PCT/IB02/01247 on Apr. 18, 2002, now abandoned.

(30) Foreign Application Priority Data

May 10, 2001 (EP) .................................. 01111158

(51) Int. Cl.
*C09J 175/04* (2006.01)
*C09J 11/04* (2006.01)
*C08K 3/04* (2006.01)
*C08K 3/26* (2006.01)

(52) U.S. Cl. ..................... 523/200; 524/322; 524/425; 524/495; 524/496; 524/588

(58) Field of Classification Search ........................ None
See application file for complete search history.

(56) References Cited

U.S. PATENT DOCUMENTS

| 3,632,557 | A | 1/1972 | Brode et al. |
| 4,222,925 | A | 9/1980 | Bryant et al. |
| 5,364,955 | A | 11/1994 | Zwiener et al. |
| 5,703,146 | A | 12/1997 | Iwaki et al. |
| 5,756,751 | A | 5/1998 | Schmalstieg et al. |
| 5,990,257 | A | 11/1999 | Johnston et al. |
| 6,001,946 | A | 12/1999 | Waldman et al. |
| 6,008,271 | A | 12/1999 | Hosoda et al. |
| 6,121,354 | A | 9/2000 | Chronister |
| 6,124,387 | A | 9/2000 | Wang et al. |
| 6,136,446 | A | 10/2000 | Virnelson et al. |
| 6,197,912 | B1 | 3/2001 | Huang et al. |
| 6,498,210 | B1 | 12/2002 | Wang et al. |

FOREIGN PATENT DOCUMENTS

| DE | 199 23 300 A1 | 11/2000 |
| EP | 0 676 403 | 10/1995 |
| EP | 0 819 749 | 1/1998 |
| JP | A 2000-351894 | 6/1999 |
| WO | WO 99/55755 | 11/1999 |

*Primary Examiner*—David Buttner
(74) *Attorney, Agent, or Firm*—Oliff & Berridge, PLC

(57) ABSTRACT

The invention relates to an adhesive composition containing a special silane cross-linking polymer and fine-particle coated calcium carbonate and soot. 20 to 50 ml of fine-particle coated calcium carbonate and soot are provided for every 100 g of polymer, and the volume ratio of fine-particle coated calcium carbonate and soot is between 70:30 and 30:70. The inventive adhesive composition is characterized by having good mechanical properties, a high electrical volume resistance and a good applicability.

15 Claims, No Drawings

ADHESIVE FILLED WITH SURFACE-TREATED CHALK AND SOOT

REFERENCE TO RELATED APPLICATIONS

This application is a Continuation of application Ser. No. 11/399,364 filed Apr. 7, 2006, now abandoned which is Continuation of application Ser. No. 10/476,525 filed Nov. 3, 2003, now abandoned which in turn is a National Stage of International Application No. PCT/IB02/01247, filed Apr. 18, 2002, which claims the priority benefit of European patent application no. 01 111 158.0, which was filed May 10, 2001 and whose entire disclosure content is hereby incorporated by reference.

TECHNICAL FIELD

The present invention relates to filled adhesives, especially filled silane-crosslinking adhesives.

PRIOR ART

Polyurethane polymers have long been known as especially suitable materials for adhesive applications requiring high flexibility in conjunction with good strengths. One-component systems, in which isocyanate end groups of the polyurethane polymer react with atmospheric moisture to crosslink the polymer, have the advantage of simple applicability, since they require no metering of the second component and no mixing operation. Systems of this kind find widespread application as adhesives and sealants in industry and in construction. A further development of these polyurethane polymers involves replacing the isocyanate functional groups by silane groups, which likewise crosslink with atmospheric moisture to form Si—O—Si bonds. The preparation of silane-crosslinking polyurethane polymers by reaction of the terminal isocyanate groups with mercapto-functional or amino-functional silanes is described for example in U.S. Pat. No. 3,632,557 (Union Carbide) and U.S. Pat. No. 5,364,955 (Bayer). U.S. Pat. No. 3,632,557 (Union Carbide) describes the preparation of silane-crosslinking organic polymers by reacting terminal isocyanate groups of polyurethane prepolymers with mercapto-functional or amino-functional silanes. These polymers may comprise, inter alia, a filler. Neither calcium carbonate nor soot are listed as examples.

On the basis of said patent it is indeed possible to prepare silane-crosslinking polyurethane adhesives and sealants, but the mechanical values thereby achievable for formulations having raw materials costs that are in tune with the market range within the order of magnitude of 1.5 MPa tensile strength and 150% elongation at break, which is inadequate for use as an adhesive in the automobile industry.

U.S. Pat. No. 5,364,955 (Bayer) describes, for the preparation of silane-crosslinking polyurethane polymers, special secondary aminosilanes (aspartic ester derivatives) which are attached to polyurethane prepolymers having isocyanate end groups. The silane-terminal polymers can be used for formulating sealing materials. Indications of especially suitable fillers for achieving special properties are not mentioned.

The advantage of crosslinking via silane groups is that, on the one hand, crosslinking is not accompanied by the formation of any $CO_2$, which under certain circumstances can lead to disruptive bubbles in the adhesive, and that, on the other hand, the user does not come into contact with monomeric isocyanates, which are a potential health hazard.

In addition to these documents which are unspecific as regards the fillers there are already works which deal with the attaining of special properties through the use of specific fillers.

U.S. Pat. No. 6,001,946 (Witco) describes more or less the same silane-terminal polyurethane prepolymers, based on aspartic ester derivatives of amino-functional silanes, as U.S. Pat. No. 5,364,955. Reinforcing fillers listed include fumed silica, precipitated silica, and calcium carbonate, with treated calcium carbonate having a particle size of from 0.07 to 4 microns particle size being referred to as a preferred filler. These fillers can be used alone or as a filler combination. As a preferred quantity of filler mention is made of from 80 to 150 parts per 100 parts of polymer. On the basis of that patent it is possible to achieve adhesives having tensile strengths of approximately 1.5 MPa with approximately 300% elongation. Adhesives of this kind are not strong enough for use in the automobile industry.

EP 0 676 403 (Witco) describes silane-terminal polyurethane polymers containing arylamino-functional silanes. Sealants based on these polymers are said to have higher elongation, higher flexibility, and a lower elasticity modulus than the prior art at that time. Described as preferred calcium carbonate fillers are treated types having particle sizes of from 0.05 to 10 microns in an amount of up to 100 parts per 100 parts of polymer. On the basis of that patent it is possible to achieve adhesives having tensile strengths of approximately 2.8 MPa at 300% elongation. This tensile strength is still too low for application in the automobile industry. Additionally it has been found that silane-crosslinking polyurethane polymers which comprise phenylamino silane have a poor aging stability in the cured state under hot storage.

U.S. Pat. No. 5,703,146 (Kaneka) describes sealants composed of 100 parts of silane-terminal oxypropylene polymer with a narrow molecular weight distribution, from 100 to 200 parts of calcium carbonate with a particle size of not more than 0.5 micron, and surface-treated with a fatty acid, and a number of further additions. The polymer has a fraction of 15-35% in the overall composition. Through the combination of the polymer having the narrow molecular weight distribution and hence low viscosity with the fine-particle coated calcium carbonate stability is obtained adequately in combination with effective extrudibility, but sufficiently high tensile strengths are not obtained.

U.S. Pat. No. 4,222,925 (Inmont Corporation) describes an adhesive with a rapid curing rate and high strength, which is used in combination with a primer in automobile engineering to glue in windshields. The adhesive is composed of a silane-terminal polyurethane polymer (prepared as described in U.S. Pat. No. 3,632,557), a special amino-functional silane, and soot with a water content of not more than 0.05%. The addition of dried soot is said significantly to increase the mechanical strength of the adhesive. General indications of the amount of soot used are absent, though example 2 discloses the use of 35 parts of soot per 100 parts of polymer, which leads to very high mechanical values. An adhesive formulation with a total fraction of 73% polymer in the formulation is too expensive, however, for a utility in tune with practice.

WO 99/55755 (Essex) describes a method of gluing windows into a structure. The adhesive used is based on a silane-terminal oxyalkylene polymer, a silane-terminal polyurethane polymer, or similar silane-terminal systems. The polymer preferably has a fraction in the overall composition of the adhesive of from 45 to 85%, contains a tin catalyst in a preferred amount of from 0.1 to 0.4%, a special amino-functional silane and other additives. Soot, calcium carbonate, and other reinforcing fillers are listed as possible additives, with preference being given to soot as the sole reinforcing filler used. An amount of reinforcing filler of from 20 to 33%, based on the overall adhesive composition, is preferred, and compositions having tensile strengths of up to 1028 psi (=7.1 MPa) are disclosed. As a consequence of the high soot fraction in the adhesive it is impossible to achieve, with these adhesives, the high electrical volume resistance required for adhesive bonds in the automobile industry.

It is also already known to use both fine-particle coated calcium carbonate and soot as an addition to silane-crosslinking polymers.

EP 0 819 749 (Simson) describes silane-crosslinking adhesives and sealants with high electrical resistance which are suitable for industrial applications, such as the gluing in of auto windshields, or, in particular, as an adhesive and sealant for electrical appliances. These adhesives and sealants must include the following components: silane-terminal polymer, crosslinking catalyst, dryer, adhesion promoter, and rheology controller, it being possible for from 25% to 55% of the composition to be in the form of a calcium carbonate filler. When precipitated calcium carbonate grades coated with fatty acid are used, the viscosity of the composition is said to be increased, and the stability and—given the choice of a mixture of precipitated and unprecipitated calcium carbonate—the mechanical strength are said to be improved. Soot, in an amount of from 0.2 to 5% based on the overall composition, is mentioned as a pigment.

EP 0 931 800 (Witco Corp.) describes sealants having improved mechanical values, good curing rate, low surface tack and not excessively high viscosity. They are based on a silane-terminal polyurethane prepolymer which is prepared by reacting an OH-terminal polyurethane pre-polymer with an isocyanate-functional silane. Possible reinforcing fillers mentioned include fumed silica, precipitated silica, and calcium carbonate, with soot being proposed as the principal filler in order to bring about even further reinforcement. Treated calcium carbonates having particle sizes of from 0.07 to 4 microns are preferred fillers. The fillers can be used alone or in combination, with the stated preferred amount of filler being from 80 to 150 parts per 100 parts of polymer. The maximum tensile strength achieved in the examples is 2.7 MPa.

None of these documents reveals any indication as to what must be the construction of an adhesive composition based on a silane-terminated polymer in order to meet the requirements imposed in the automobile industry. None of these documents suggests that, using a special type of silane-terminated polymers, namely special silane-crosslinking polyurethane prepolymers, there exists a range within which the silane-crosslinking polyurethane prepolymers can be filled with a combination of fine-particle coated calcium carbonate and soot in such a way as to provide the properties necessary for the preparation of adhesives for the automobile industry. Owing to the high mechanical loads of the adhesive layer, these properties are a high strength of the adhesive in combination with good flexibility and, in order to achieve corrosion-resistant adhesive bonding between different metals, a high electrical volume resistance of the cured adhesive. More specifically these properties are a tensile strength of at least 4.5 MPa,
an elongation at break of at least 250%,
an electrical volume resistance of at least $10^8$ ohm cm, and good applicability, all in combination with
raw materials costs that are not too high.

A high electrical volume resistance is also important because an excessive conductivity of the adhesive layer can cause disruptions to the receiving of radio when rear screens with built-in aerials are glued in.

A further prerequisite for an adhesive in tune with practice is its good applicability. In other words, the uncured adhesive must be able to be extruded from the cartridge with reasonable force in the case of repair. The extrusion force from the cartridge through an opening with a diameter of 5 mm ought not to exceed a level of 2 000 N.

Moreover, the raw materials costs of a silane-crosslinking polyurethane adhesive in tune with practice must not exceed a certain limit. Formulations which have a high polymer fraction of 70% or more are therefore not in tune with the market.

Meeting all of these requirements is not possible with a silane-crosslinking adhesive in accordance with the present state of the art.

Surprisingly it has been found that silane-crosslinking polyurethane adhesives that meet the aforementioned requirements for the adhesive bonding of components in the automobile industry can be formulated by combining a special, silane-crosslinking polyurethane polymer in a defined range with fine-particle coated calcium carbonate and soot.

DEPICTION OF THE INVENTION

The present invention accordingly provides adhesives able to meet the requirements specified above. Such adhesives of the invention comprise the following three constituents:

a) silane-crosslinking polyurethane polymer constructed in accordance with the following formula (I):

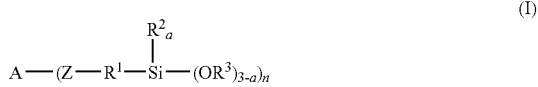

where $R^1$ stands for an alkyl group having 2 to 8 carbon atoms, linear or branched,
$R^2$ stands for an alkyl radical having 1 to 8 carbon atoms,
$R^3$ stands for an alkyl radical having 1 to 5 carbon atoms,
a stands for 0 or 1,
Z stands for a sulfur or an $NR^4$, where $R^4$ stands for a hydrogen atom or an organic radical, for example, an alkyl group or an aryl group having 1 to 20 carbon atoms, or a compound having ester groups such as, for example, a moiety of the formula (II)

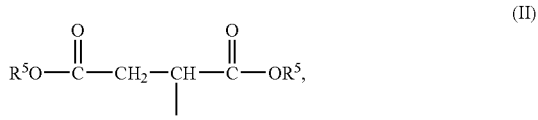

where $R^5$ stands for an alkyl group having 1 to 8 carbon atoms,
n denotes a number from 2 to 4,
and A stands for a radical of a polyurethane prepolymer with the functionality n, b) fine-particle coated calcium carbonate, by which is meant fatty acid-treated calcium carbonates having a particle size of from 0.05 to 1 micron, with a density of approximately 2.6-2.7 g/ml, and c) soot, preference being given to grades having a large surface area, with a density of approximately 1.8 g/ml,
there being from 20 to 50 ml of fillers b)+c) per 100 g polymer a), and the volume ratio of b) to c) being between 70/30 and 30/70.

Preferably A stands for a polyurethane radical obtainable by reacting commercially customary polyols with an excess of commercially customary polyisocyanates, the average molecular weight of A usually being in the range from 500 to 100 000 g/mol, and A containing at least n urethane groups. In particular A denotes a radical of the formula (III)

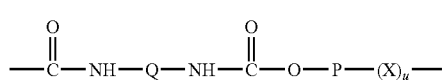 (III)

where Q stands for an aromatic, aliphatic or cycloaliphatic radical which represents in particular a polyisocyanate, with special preference a commercially customary diisocyanate, following elimination of two or more isocyanate groups, and P stands for a radical which represents a polyoxyalkylene-polyol or polyalkyldiene-polyol, in particular a commercially customary polyol, following elimination of at least two OH groups, X denotes a radical of the formula (IV)

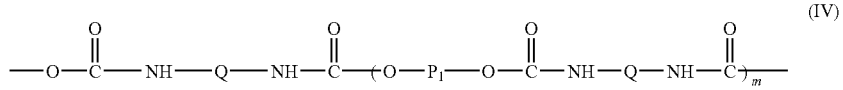 (IV)

where m independently of one another denotes 0 to 5 and where

Q has the abovementioned definition and where $P_1 = P$ or denotes $P(X)_u$, with the proviso that not more than one $P^1$ is $P(X)_u$ and where $u = 1$ or 2.

Where the abovementioned conditions are observed the resultant adhesives are suitable for the sealing adhesive bonding of components which consist at least in part of metal, as in the automobile industry, for example. The adhesives have good mechanical properties, a high electrical volume resistance, good applicability and reasonable raw materials costs. They can be applied effectively (i.e., they have an extrusion force of not more than 2 000 N), they have a tensile strength of at least 4.5 MPa, an elongation break of at least 250%, and they have an electrical volume resistance of at least $10^8$ ohm cm.

Way(s) of Performing the Invention

An essential constituent of the adhesive compositions of the invention is the silane-crosslinking polyurethane polymer which is constructed in accordance with the following formula (I):

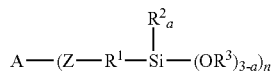 (I)

where $R^1$ stands for an alkyl group having 2 to 8 carbon atoms, linear or branched, $R^2$ stands for an alkyl radical having 1 to 8 carbon atoms, $R^3$ stands for an alkyl radical having 1 to 5 carbon atoms, a stands for 0 or 1, Z stands for a sulfur or an $NR^4$, where $R^4$ stands for a hydrogen atom or an organic radical, for example, an alkyl group or an aryl group having 1 to 20 carbon atoms, or a compound having ester groups such as, for example, a moiety of the formula (II)

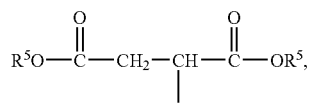 (II)

where $R^5$ stands for an alkyl group having 1 to 8 carbon atoms, n denotes a number from 2 to 4, and A stands for a radical of a polyurethane prepolymer with the functionality n.

Preferably A stands for a polyurethane radical obtainable by reacting commercially customary polyols with an excess of commercially customary polyisocyanates, the average molecular weight of A usually being in the range from 500 to 100 000 g/mol, and A containing at least n urethane groups. In particular A denotes a radical of the formula (III)

 (III)

where Q stands for an aromatic, aliphatic or cycloaliphatic radical which represents in particular a polyisocyanate, with special preference a commercially customary diisocyanate, following elimination of two or more isocyanate groups, an P stands for a radical which represents a polyoxyalkylene-polyol or polyalkyldiene-polyol, in particular a commercially customary polyol, following elimination of at least two OH groups, X denotes a radical of the formula (IV)

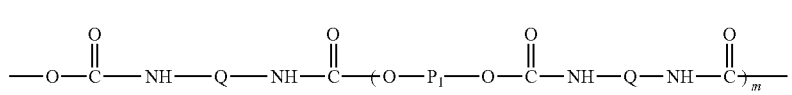 (IV)

where m independently of one another denotes 0 to 5 and where

Q has the abovementioned definition and where
$P_1=P$ or denotes $P(X)_u$, with the proviso that not more than one $P_1$ is $P(X)_u$ and where
u=1 or 2.

In the preferred case of n=2 the radical A can be depicted by the formula (V):

where Q stands for a radical which represents a diisocyanate, in particular a commercially customary diisocyanate, following elimination of the two isocyanate groups and P stands for a radical which represents a polyol, in particular a commercially customary polyol, following elimination of the two OH groups, and m=0 to 5.

Preferred polyisocyanates are diisocyanates.

Examples that may be mentioned include the following isocyanates, which are very well known in polyurethane chemistry:

2,4- and 2,6-toluene diisocyanate, 4,4'- and 2,4'-diphenylmethane diisocyanate, isophorone diisocyanate, 2,2,4- and 2,4,4-trimethyl-1,6-hexamethylene diisocyanate, 1,6-hexamethylene diisocyanate, m- and p-tetramethylxylylene diisocyanate, the isomers of 4,4'- or 2,4'-dicyclohexylmethane diisocyanate, polymers or oligomers of these isocyanates, and mixtures of two or more of the stated isocyanates.

Polyols which, following elimination of at least two OH groups, produce the radical P are preferably the following raw materials, which are very well known in polyurethane chemistry, or mixtures thereof:

polyetherpolyols, which are the polymerization product of ethylene oxide, propylene oxide or butylene oxide or mixtures thereof, or hydroxy-terminated polybutadiene polymers. The polyols generally have an OH functionality of from 1.8 to 3 and a molecular weight from 500 to 20 000 g/mol. In addition to said polyols it is possible in the preparation to use compounds having two or more OH groups, as well, as chain extenders or crosslinkers, so that their radicals may likewise contribute to P. Examples that may be mentioned include 1,4-butane diol and trimethylol propane.

The silane-terminated prepolymers used in accordance with the invention can be prepared by reacting, in a first step, polyols with an excess of polyisocyanate, to give a prepolymer having isocyanate end groups. These isocyanate end groups are subsequently reacted with an organofunctional silane containing an isocyanate-reactive group.

Suitable organofunctional silanes are compounds with the formula (VI)

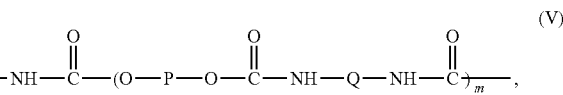

where $R^1$, $R^2$, $R^3$ and a have the definition described above and Y stands for —SH or —$NH_2$ or —$NHR^4$, and $R^4$ likewise has the definition described above. Particularly suitable is an amino silane containing as $R^4$ the following moiety (II)

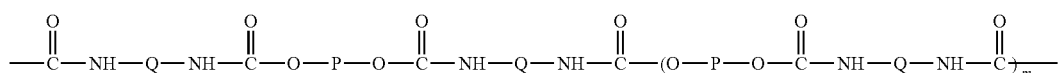

where $R^5$ stands for an alkyl group having 1 to 8 carbon atoms.

Organofunctional silanes of this kind can be prepared from the corresponding maleic or fumaric diester and an amino silane where Y=—$NH_2$ by means of an addition reaction across the double bond. An example that may be mentioned of an organofunctional silane compound of this kind is the one below, prepared from diethyl maleic and γ-aminopropyltrimethoxysilane:

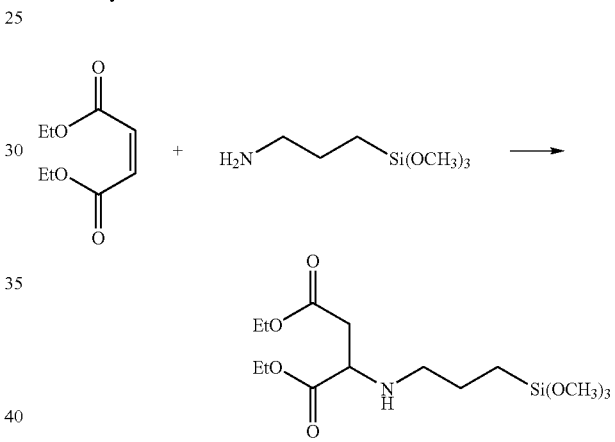

As polyols it is possible to use the raw materials already mentioned above as "suppliers" of the radical P, which are very well known in polyurethane chemistry, or mixtures of such materials.

Suitable polyisocyanates for preparing such a prepolymer include the aliphatic, cycloaliphatic or aromatic isocyanates having at least two isocyanate groups per molecule, likewise mentioned already above as "suppliers" of the radical Q.

The preparation can take place by reacting the polyol component and the isocyanate component by customary methods, e.g., at temperatures of from 50 to 100° C., where appropriate using suitable catalysts, and employing the isocyanate component in excess. The reaction product formed is the aforementioned polyurethane prepolymer having isocyanate end groups. This prepolymer is subsequently reacted with the isocyanate-reactive organofunctional silane described, and the aforementioned silane-terminal polyurethane prepolymer is formed. The organofunctional silane is used stoichiometrically or in a slight excess in relation to the isocyanate groups.

Particularly suitable as the fine-particle coated calcium carbonate described under b) are calcium carbonates which have been surface-coated with fatty acids, such as stearates, for example, and which have an average particle size of from 0.05 to 1 micron. The amount of organic substance ranges between 0.9 and 5% weight fractions. Examples of grades which are especially suitable are Winnofil SP and Winnofil SPT from ICI or Socal U1S2 from Solvay. The density of these materials is from about 2.6 to 2.7 g/ml.

The soot specified under c) is preferably a grade having a large surface area and having a density of approximately 1.8 g/ml, All possible soot grades are suitable, provided they have been dried before being mixed into the prepolymer. In order to reduce the electrical conductivity it is possible to use fully or partly oxidized soot grades, these grades being more expensive and therefore being usable only in restricted form—in order to give a market-compatible product which is not too expensive.

So that even when using unoxidized soot it is possible to obtain a product which meets the required properties, referred to above, the proportions are important. Consequently there are preferably from 20 to 50 ml of fillers b)+c) per 100 g of polymer a), and the volume ratio of b) to c) is between 70/30 and 30/70.

Besides these components, which are necessarily present, the adhesive of the invention may comprise one or more of the following constituents:

Plasticizers, examples being organic esters, e.g., phthalates such as dioctyl phthalate or diisodecyl phthalate, adipates such as dioctyl adipate, for example, polybutenes or other compounds which are not reactive toward silanes, solvents, further organic or inorganic fillers such as, for example, other calcium carbonates, kaolines, aluminas, silicas, fibers, e.g., of polyethylene, pigments, thickeners, e.g., urea compounds or polyamide waxes, heat stabilizers or UV stabilizers, adhesive promoters, e.g., amino silanes or epoxy silanes, especially $H_2N$—$(CH_2)_3$—$Si(OCH_3)_3$, $H_2N$—$(CH_2)_2$—$NH$—$(CH_2)_3$—$Si(OCH_3)_3$ or $NH$—$[(CH_2)_3$—$Si(OCH_3)_3]_2$, dryers, vinyltrimethoxy silane for example, catalysts, amine compounds for example such as isophoronediamine or Jeffamines, for example, or organotin compounds, such as dibutyltin laurate, dibutyltin acetylacetonate for example, or other catalysts customary in polyurethane chemistry, and also further substances normally used in polyurethane sealants and adhesives.

As compared with the silane-crosslinking polyurethane prepolymers the adhesives of the present invention have the advantage that they are isocyanate-free and, by virtue of the inventive combination of a special silane-crosslinking polyurethane prepolymer, soot, and fine-particle coated calcium carbonate, are suitable for applications requiring at one and the same time tensile strengths of more than 4.5 MPa, elongations at break of more than 250%, an electrical volume resistance of more than $10^8$ ohm cm, and good applicability. Examples of such applications are the sealing and adhesive bonding of metallic components, especially flexible adhesive bonding. The adhesives of the invention are therefore, on the one hand, suitable for the production of buses, trucks, and rail vehicles, and, on the other hand, are even able to meet the requirements imposed on assembly adhesives in the automobile industry.

The invention is illustrated below with reference to examples which are not, however, intended in any way to restrict it.

EXAMPLES

Starting Materials Used:

| | |
|---|---|
| Polyol PPG 12000 | Acclaim 12200 from Bayer |
| Plasticizer | Diisodecyl phthalate, e.g. from BASF |
| Fine-particle coated calcium carbonate | Socal U1S2 from Solvay |
| Soot | Printex 60 from Degussa Hüls |
| Catalyst solution | 90 parts by weight diisodecyl phthalate 10 parts by weight dibutyltin dilaurate |

Description of the Test Methods:

The extrusion force was determined in aluminum cartridges having a diameter of 45 mm, the adhesive being pressed through an opening of 5 mm at the tip of the cartridge. Extrusion took place by means of a tensile testing machine, with recording of the required force, at a rate of 60 mm/min.

The tensile strength and the elongation at break were determined on cured films in a layer thickness of approximately 3 mm in accordance with DIN 53504 (S2).

The electrical volume resistance was measured at 1 000 V on cured films in a layer thickness of approximately 3 mm in accordance with DIN 53482.

Example 1

Diethyl N-(3-trimethoxysilylpropyl)aspartate (maleic ester aminosilane adduct)

509.9 g γ-aminopropyltrimethoxysilane were introduced into a vessel. Subsequently 490.1 g of diethyl maleic were added slowly, dropwise, and with thorough stirring at room temperature. The temperature rise, caused by the exothermic reaction, was arrested at 30° C. by cooling in a waterbath. The mixture was subsequently stirred at room temperature for 8 hours until the reaction was at an end.

Example 2

Silane-terminated Polyurethane Prepolymer 1 000 g of polyol PPG 12000, 78.7 g of isophorone diisocyanate, and 0.13 g of dibutyltin dilaurate were heated to 90° C. with constant stirring and left at that temperature until the free isocyanate group content reached a figure of 0.7%. Subsequently 63.2 g of diethyl N-(3-trimethoxysilylpropyl)aspartate from example 1 were mixed in and the mixture was stirred at 90° C. for approximately 4 hours until free isocyanate could no longer be detected by means of IR spectroscopy. Subsequently 0.4 g of silane A-171 was mixed in in order to scavenge residual moisture, and the prepolymer was cooled to room temperature and stored in the absence of moisture.

Examples 3 to 7

Inventive Adhesives

The ingredients of the individual examples were mixed homogeneously in the order according to table 1 in a suitable vacuum mixer, e.g., Planimax from Molteni. In a first step the prepolymer, the plasticizer, and the fillers were homogenized, and subsequently the additional silanes and the catalyst solution were mixed in. The finished adhesives were filled into airtight cartridges.

Examples 8 to 11

Adhesives Outside the Scope of the Invention

The preparation procedure is the same as for examples 3 to 7.

TABLE 1

Composition of the adhesives (parts by weight)

| | Example: | | | | | | | | |
|---|---|---|---|---|---|---|---|---|---|
| | 3 | 4 | 5 | 6 | 7 | 8 | 9 | 10 | 11 |
| Prepolymer from example 2 | 100 | 100 | 100 | 100 | 100 | 100 | 100 | 100 | 100 |
| Plasticizer | 35 | 35 | 35 | 35 | 35 | 35 | 35 | 35 | 35 |
| Fine-particle coated calcium carbonate | 31.2 | 62.4 | 52 | 41.6 | 78 | 104 | 78 | 26 | 0 |
| Soot | 32.4 | 28.8 | 36 | 43.2 | 36 | 0 | 18 | 54 | 72 |
| Vinyltrimethoxysilane | 2.5 | 2.5 | 2.5 | 2.5 | 2.5 | 2.5 | 2.5 | 2.5 | 2.5 |
| N-β-(aminoethyl)-γ-aminopropyltrimethoxysilane | 2.5 | 2.5 | 2.5 | 2.5 | 2.5 | 2.5 | 2.5 | 2.5 | 2.5 |
| Catalyst solution | 2.5 | 2.5 | 2.5 | 2.5 | 2.5 | 2.5 | 2.5 | 2.5 | 2.5 |

TABLE 2

Degree of filling of the adhesives per 100 g of polymer

| | Example: | | | | | | | | |
|---|---|---|---|---|---|---|---|---|---|
| | 3 | 4 | 5 | 6 | 7 | 8 | 9 | 10 | 11 |
| Total filler volume | 30 ml | 40 ml | 40 ml | 40 ml | 50 ml | 40 ml | 40 ml | 40 ml | 40 ml |
| Calcium carbonate/soot ratio (by volume) | 40/60 | 60/40 | 50/50 | 40/60 | 60/40 | 100/0 | 75/25 | 25/75 | 0/100 |
| Inventive composition: | Yes | Yes | Yes | Yes | Yes | No | No | No | No |

TABLE 3

Properties of the adhesives

| | Example: | | | | | | | | |
|---|---|---|---|---|---|---|---|---|---|
| | 3 | 4 | 5 | 6 | 7 | 8 | 9 | 10 | 11 |
| Extrusion force [N] | 660 | 870 | 1100 | 1640 | 2000 | 240 | 510 | 3000 | 7000 |
| Tensile strength [MPa] | 5.9 | 4.8 | 5.5 | 4.5 | 4.9 | 1.8 | 3.3 | 4.8 | 6.3 |
| Elongation at break [%] | 300 | 280 | 300 | 250 | 250 | 330 | 310 | 160 | 150 |
| Electrical volume resistance [ohm cm] | $4.3 \times 10^{10}$ | $3.1 \times 10^{10}$ | $2.7 \times 10^{10}$ | $1.2 \times 10^{10}$ | $3.0 \times 10^{11}$ | $1.3 \times 10^{11}$ | $1.3 \times 10^{11}$ | $1.4 \times 10^{7}$ | $3.2 \times 10^{5}$ |

The inventive adhesives of examples 3 to 7 meet the required properties, i.e., they have a tensile strength of at least 4.5 MPa, an elongation at break of at least 250%, an electrical volume resistance of at least $10^8$ ohm cm, an extrusion force of not more than 2 000 N.

The adhesives from examples 8 to 11, which lie outside the scope of the invention, do not meet all of the required properties. Examples 8 and 9, which contain no soot or only a small fraction of soot, have inadequate tensile strength. Examples 10 and 11, which contain only a small fraction of coated calcium carbonate or none at all, have an excessive extrusion force, an inadequate elongation at break, and an electrical volume resistance which is too low.

Whereas the present application describes preferred embodiments of the invention, it should clearly be pointed out that the invention is not restricted to these embodiments and may also be performed in other ways within the scope of the claims which follow.

What is claimed is:

1. An adhesive composition comprising at least one silane-crosslinking polymer, fine-particle coated calcium carbonate, and soot, wherein
   a) the at least one silane-crosslinking polyurethane polymer is constructed in accordance with the following formula (I):

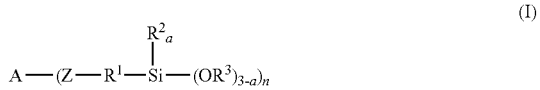

wherein $R^1$ is an alkyl group having 2 to 8 carbon atoms, linear or branched, $R^2$ is an alkyl radical having 1 to 8 carbon atoms, $R^3$ is an alkyl radical having 1 to 5 carbon atoms, a is 0 or 1, Z is a sulfur atom or of the formula of $NR^4$, wherein $R^4$ is a hydrogen atom or an organic radical, n is an integer from 2 to 4, and A is a radical of a polyurethane prepolymer with the functionality n, b) the fine-particle coated calcium carbonate is coated with fatty acid, and having a particle size of from 0.05 to 1 micron and a density of approximately 2.6-2.7 g/ml, and c) the soot has a density of approximately 1.8 g/ml, wherein the adhesive composition is comprised of from 20 to 50 ml of fillers b)+c) per 100 g polymer a), and the volume ratio of b) to c) in the adhesive composition is from 70/30 to 30/70.

2. The adhesive composition according to claim 1, wherein the radical A is a polyurethane prepolymer radical obtained by reacting polyols with an excess of polyisocyanates, the average molecular weight of A is in the range from 500 to 100,000 g/mol, and A contains at least n urethane groups.

3. The adhesive composition according to claim 1, wherein the radical A is a radical of the formula (III)

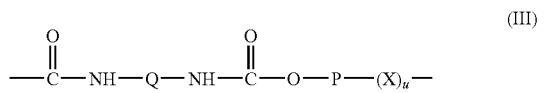

(III)

wherein Q is an aromatic, aliphatic or cycloaliphatic radical that remains following the elimination of at least 2 isocyanate groups from a polyisocyanate, wherein P is a radical that remains following the elimination of at least two OH groups from a polyoxyalkylene-polyol or a polyalkyldiene-polyol, wherein u is 1 or 2, wherein X is a radical of the formula (IV),

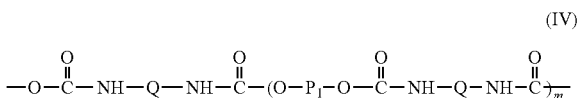

(IV)

wherein m is from 0 to 5, wherein Q is defined above, wherein $P_1$ is P or $P(X)_u$, with the proviso that not more than one $P_1$ is $P(X)_u$ and, wherein the average molecular weight of A is from 500 to 100,000 g/mol.

4. The adhesive composition according to claim 1, wherein the radical A is a radical of the formula (V)

wherein Q is an aliphatic, a cycloaliphatic or an aromatic radical that remains following the elimination of at least 2 isocyanate groups from a polyisocvanate, and wherein P is a radical that remains following the elimination of at least 2 OH groups from a polyalkyldiene-polyol or polyoxyalkylene-polyol and wherein m is from 0to 5.

5. The adhesive composition according to claim 3, wherein Q is a radical which remains following elimination of at least 2 isocyanate groups from a polyisocyanate selected from the group consisting of 2,4- and 2,6-toluene diisocyanate, 4,4'- and 2,4'-diphenylmethane diisocyanate, isophorone diisocyanate, 2,2,4- and 2,4,4-trimethyl-1,6-hexamethylene diisocyanate, 1,6-hexamethylene diisocyanate, m- and p-tetramethylxylylene diisocyanate, the isomers of 4,4' or 2,4'-dicyclohexylmethane diisocyanate, and combinations thereof.

6. The adhesive composition according to claim 3, wherein P is a radical that remains following the elimination of at least two OH groups from a polyol selected from the group consisting of polyetherpolyols, and hydroxy-terminated polybutadiene polymers.

7. The adhesive composition according to claim 1, wherein the adhesive composition further comprises one or more of the following constituents selected from the group consisting of plasticizers, additional organic or inorganic fillers, kaolines, aluminas, silicas, fibers, pigments, thickeners, heat stabilizers, UV stabilizers, adhesion promoters, dryers, and catalysts.

8. The adhesive composition according to claim 1, wherein Z is $NR^4$ and wherein $R^4$ an alkyl group or an aryl group having 1 to 20 carbon atoms, or a compound having ester groups.

9. The adhesive composition according to claim 1, wherein Z is $NR^4$ and $R^4$ is moiety of the formula (II)

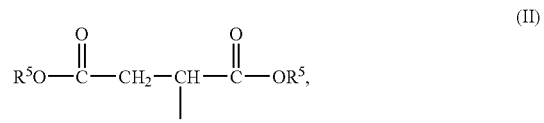

(II)

wherein $R^5$ stands for an alkyl group having 1 to 8 carbon atoms.

10. The adhesive composition according to claim 1, wherein the electrical resistance of the adhesive composition is at least $10^8$ Ohm.cm.

11. A process for preparing an adhesive composition, the process comprising:

adding a polyol with an excess of polyisocyanate to form a prepolymer having isocyanate end groups, reacting the isocyanate end groups with at least one organofunctional silane containing an isocyanate-reactive group to form at least one silane-crosslinkable polyurethane prepolymer, and

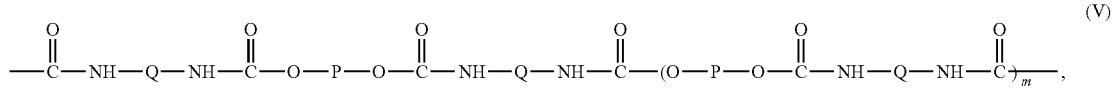

(V)

mixing the prepolymer in the absence of moisture with predried soot and with predried fine-particle coated calcium carbonate, wherein:

a) the at least one silane-crosslinking polyurethane polymer has the following formula (I):

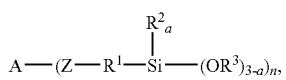
 (I)

wherein $R^1$ is an alkyl group having 2 to 8 carbon atoms, linear or branched, $R^2$ is an alkyl radical having 1 to 8 carbon atoms, $R^3$ is an alkyl radical having 1 to 5 carbon atoms.

a is 0 or 1,

Z is a sulfur atom or of the formula of $NR^4$, wherein $R^4$ is a hydrogen atom or an organic radical, n is an integer from 2 to 4, and A is a radical of a polyurethane prepolymer with the functionality n, b) the fine-particle coated calcium carbonate is coated with fatty acid, and having a particle size of from 0.05 to 1 micron and a density of approximately 2.6-2.7 g/ml, and c) the soot has a density of approximately 1.8 g/ml, wherein the adhesive composition is comprised of from 20 to 50 ml of fillers b)+c) per 100 g polymer a), and the volume ratio of b) to c) in the adhesive composition is from 70/30 to 30/70.

12. The process according to claim 11, wherein the organofunctional silane is a compound with the following formula (VI)

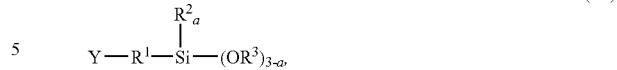
 (VI)

wherein $R^1$ is an alkyl group having 2 to 8 carbon atoms, linear or branched, $R^2$ is an alkyl radical having 1 to 8 carbon atoms, $R^3$ is an alkyl radical having 1 to 5 carbon atoms, wherein Y is —SH or —$NH_2$ or —$NHR^4$, wherein a is 0 or 1, and wherein $R^4$ is an organic radical.

13. The process according to claim 11, wherein the polyol and the polyisocyanate are reacted at temperatures of from 50 to 100° C., optionally in the presence of a catalyst, the polyisocyanate being employed in excess, and wherein the polyurethane prepolymer having isocyanate end groups is subsequently reacted with the organofunctional silanes stoichiometrically or in a slight excess of the polyisocyanate.

14. The process of claim 12, wherein $R^4$ is an alkyl group or an aryl group having 1 to 20 carbon atoms, or a compound having ester groups.

15. The process of claim 12, wherein $R^4$ a moiety of the formula (II)

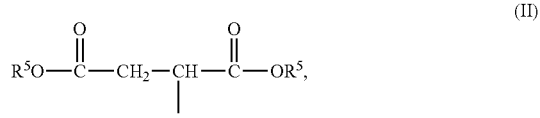
 (II)

where $R^5$ stands for an alkyl group having 1 to 8 carbon atoms.

* * * * *